Dec. 25, 1928.
P. H. PFEIL
1,696,448
ANTISKID CHAIN
Filed March 8, 1927
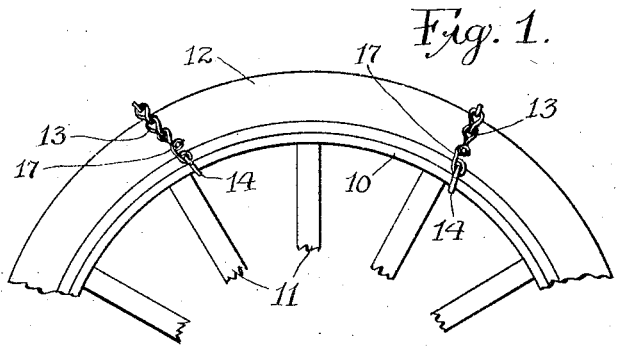
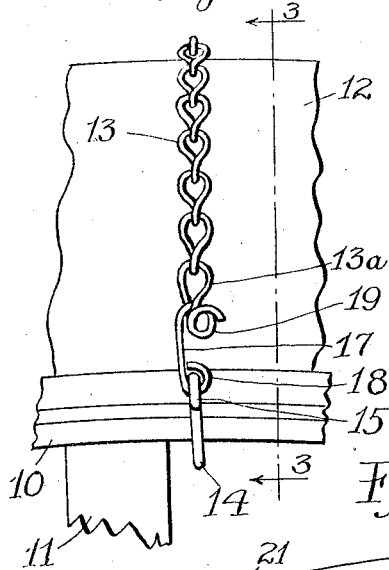
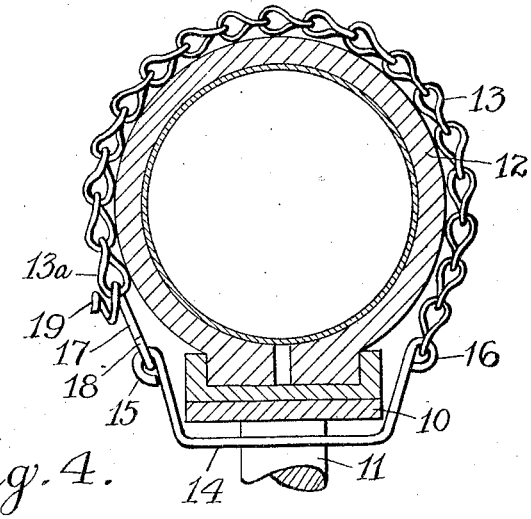
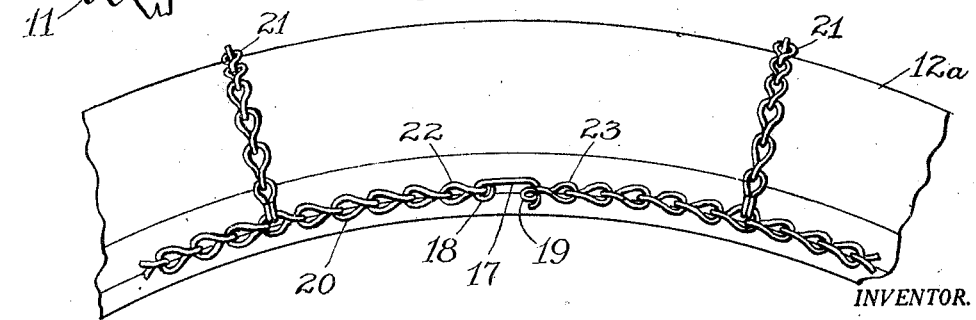
INVENTOR.
PHILIP H. PFEIL
BY Albert C. Bell
ATTORNEY Patented Dec. 25, 1928.

1,696,448

UNITED STATES PATENT OFFICE.

PHILIP H. PFEIL, OF CHICAGO HEIGHTS, ILLINOIS.

ANTISKID CHAIN.

Application filed March 8, 1927. Serial No. 173,643.

My invention relates to an improved construction of anti-skid chains for use on the wheels of self propelled vehicles. It has been proposed in the past to use chains arranged and constructed in one manner or another for the purpose of preventing skidding of the wheels of vehicles and to facilitate placing the chains on the wheels, fastening and connecting devices of various kinds have been proposed. These fastening devices, as heretofore constructed, have been open to several objections, first, if of simple and inexpensive construction, they have required a prohibitive amount of looseness of the chains to permit engaging and disengaging the fastening devices, and, second, if constructed in a manner to obviate the looseness of the chains, they have been of relatively complicated and expensive construction.

The object of my present invention is to produce a connecting and fastening device for anti-skid chains, which is simple and inexpensive in construction, easy to manipulate, and requires practically no slack in the chain to engage and disengage it. My improved connecting and fastening devices may be employed with different types of anti-skid chains as desired, for example they are equally applicable to unit chains consisting when in place only of lateral rings of chain around the tires of the vehicle, or to ring type chains having parallel rings of chain around the lateral faces of the tire connected at intervals by cross chains.

My invention will best be understood by reference to the accompanying drawings showing a preferred embodiment thereof, in which Fig. 1 shows in side elevation a part of a vehicle wheel with two unit chains held thereon by my fastening devices, Fig. 2 shows in a view similar to Fig. 1 to an enlarged scale one of the chains illustrated in Fig. 1, Fig. 3 is a view of the parts shown in Fig. 2 taken along the line 3—3, and Fig. 4 shows in a view similar to Fig. 1 the use of my fastening device in connection with a chain of the circumferential ring type.

Similar numerals refer to similar parts thoughout the several views.

As shown in Fig. 1, a part of a wheel rim is illustrated at 10, supported by spokes 11 and carrying a tire 12, around which at intervals unit chains 13, 13 are placed. As more clearly shown in Figs. 2 and 3, a yoke member 14 extends across the inner surface of the rim 10, having bent ends to prevent its displacement from the position indicated in Fig. 3, said bent ends terminating in eyes 15 and 16. The eye 16 is engaged permanently by one end of the chain 13 and the other eye 15 permanently engages one end of the connecting device 17. As shown in Figs. 2 and 3, the connecting device 17 consists of a bar of metal, preferably steel, of sufficient diameter to stand the strain exerted on the chain during its use, without deforming the bent end portions of the connecting device. The yoke 14 may be similarly formed, if desired, or have any equivalent construction for securing the result above described. The connecting device 17 is bent into an eye 18 at one of its ends which is in permanent engagement with the eye 15 on the yoke 14, and at its other end the device 17 is bent in the form of an open helix of somewhat more than one complete turn, for example one and one half turns, the separation of the turns of the helix being sufficient to permit a link of the chain 13 to pass freely between the turns of the helix.

To place the chain 13 around the tire 12, all that is required is to place the yoke 14 between the desired spokes 11, and after passing the chain 13 around the tire 12, to pass the end link 13ª of the chain around the helical end of the device 17, until the link 13ª is in the position indicated in Figs. 2 and 3. It will be observed that in doing this, the link 13ª is caused in effect, and however manipulated, to make one turn around the helix and thus to impart a corresponding twist to the chain 13, to offset which, it is desirable to correspondingly and reversely twist the chain 13 before applying the link 13ª to the device 17. The diameter of the bent helical end of the device 17 is preferably such that the link 13ª can be slipped over the free end of the helical end 19 of the connecting device, while it is in the general relation indicated in Figs. 2 and 3 to the remaining links of the chain, as a result of which all that is necessary in passing the link 13ª to the position indicated in Figs. 2 and 3, is to twist the link and the chain 13 to make the last half turn around the helical portion 19. When in place as described, the projecting end of the helical portion 19 serves as a guard to prevent disengagement of the device accidentally, and when the chain is in use, no amount of shaking or rattling can disengage the link 19ª from the device 17. When it is desired to remove the chain, the link 13ª is given a motion the reverse of that above described and is readily separated from the device 17.

In the construction shown in Fig. 4, a part of a tire 12ª is illustrated with a part of a chain 20 of the circumferential ring type on one side of it, it being understood that a similar form of ring chain is placed on the other side of the tire in the manner usual with such devices and connected with the chain 20 at intervals by cross chains 21, the two ring chains and all of the cross chains being permanently secured together in any desired way, and the ring chains being provided with connecting devices for placing them on the tire and removing them from the tire as desired. In using my connecting device 17 with this type of chain, the arrangement and operation is the same with each of the ring chains so it will be necessary to describe only one of them, for example the chain 20, with one end link 22 of which the eye 18 is in permanent engagement. The helical end 19 of the connecting device 17 is of the same construction as above described, and may engage the other end link 23 of the chain 20 in the same manner above described for the link 13ª, and with the same advantages.

It will be understood that unit chains of the kind shown at 13 are applicable only where the vehicle wheels are of the so-called artillery type, or are otherwise provided with openings laterally within the wheel rim, and that where the wheels are of the disk type and imperforate at or near the rim, ring chains of the kind indicated in Fig. 4 are generally used, although the latter are also applicable if desired or preferred, to wheels of the type indicated in Fig. 1.

From the above it will be observed that I have provided a construction of fastening device for anti-skid chains, which is extremely simple in construction, positive in action, and inexpensive to make, and that it reduces the slack required in the chain to a minimum to permit connecting and disconnecting the chain by means of the device, it being unnecessary that the amount of this slack shall exceed the diameter of the helical portion 19 of the connecting device.

While I have shown my invention in the particular embodiment above described, it will be understood that I do not limit myself to this exact construction as I may employ equivalents known to the art at the time of the filing of this application without departing from the scope of the appended claims.

What I claim is:

1. A fastening device for anti-skid chains of the type consisting of a single series of links consisting of a bar for attachment with one end of said chain and having an open helical formation of substantially one and one-half turns for removable engagement with the other end of said chain.

2. A fastening device for anti-skid chains of the type consisting of a single series of links consisting of a bar having an eye at one end for permanent attachment with one end of said chain and having an open helical formation at its other end of substantially one and one-half turns for removable engagement with the other end of said chain.

In witness whereof, I hereunto subscribe my name this 4th day of March, A. D. 1927.

PHILIP H. PFEIL.